United States Patent [19]

Poerio

[11] Patent Number: 5,479,832
[45] Date of Patent: Jan. 2, 1996

[54] SNOWMOBILE TRACK ADJUSTER

[76] Inventor: Furie C. Poerio, R.D. 8, Box 80, Punxsutawney, Pa. 15767

[21] Appl. No.: 314,794

[22] Filed: Sep. 29, 1994

[51] Int. Cl.$^6$ ........................................... G01L 1/04
[52] U.S. Cl. ........................................... 73/862.453
[58] Field of Search .................. 73/862.391, 862.42, 73/862.451–862.453, 862.471, 862.541, 865.9; 254/199, 266, 243; 305/10, 31, 32

[56] References Cited

U.S. PATENT DOCUMENTS

| | | | |
|---|---|---|---|
| 1,031,208 | 7/1912 | Thompson | 73/862.453 |
| 4,103,546 | 8/1978 | Hickey et al. | 73/862.471 |

Primary Examiner—Robert Raevis

[57] ABSTRACT

A new and improved snowmobile track adjuster with a rectangular top plate having an upper surface and a lower surface. The rectangular top plate has apertures formed through two end portions thereof. The rectangular top plate is removably placed on a top portion of the adjustable tracks of the snowmobile. A rectangular bottom plate has an upper surface and a lower surface. The rectangular bottom plate has apertures formed through two end portions thereof. The lower surface has a securement nut secured to a central portion thereof. The securement nut serves to hold a spring gauge for adjusting the tension of the tracks. Two bolts are received through the apertures formed through the rectangular bottom plate and extending upwardly through the apertures formed through the rectangular top plate and coupled therewith by two wing nuts.

1 Claim, 4 Drawing Sheets

SNOWMOBILE TRACK ADJUSTER

BACKGROUND OF THE INVENTION

1. Field of the Invention

The present invention relates to a snowmobile track adjuster and more particularly pertains to adjusting the tension in a track on a snowmobile with a snowmobile track adjuster.

2. Description of the Prior Art

The use of tension devices for tracks is known in the prior art. More specifically, tension devices for tracks heretofore devised and utilized for the purpose of tensioning a track chain on tracklaying vehicles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,681,376 to Riml discloses an apparatus for tensioning a track chain of a tracklaying vehicle.

U.S. Pat. No. 4,227,749 to Hesse discloses a track tensioning apparatus and method for track-type vehicles.

U.S. Pat. No. 3,477,766 to Linsay discloses an apparatus for tensioning a track or the like.

U.S. Pat. No. 3,597,017 to Tanaka et al. discloses a device for tensioning an endless track belt.

U.S. Pat. No. 4,279,318 to Meisel, Jr. discloses a track tensioning apparatus.

While these devices fulfill their respective, particular objective and requirements, the aforementioned patents do not describe a snowmobile track adjuster for adjusting the tension in a track on a snowmobile.

In this respect, the snowmobile track adjuster according to the present invention substantially departs from the conventional concepts and designs of the prior art, and in doing so provides an apparatus primarily developed for the purpose of adjusting the tension in a track on a snowmobile.

Therefore, it can be appreciated that there exists a continuing need for new and improved snowmobile track adjuster which can be used for adjusting the tension in a track on a snowmobile. In this regard, the present invention substantially fulfills this need.

SUMMARY OF THE INVENTION

In the view of the foregoing disadvantages inherent in the known types of tension devices for tracks now present in the prior art, the present invention provides an improved snowmobile track adjuster. As such, the general purpose of the present invention, which will be described subsequently in greater detail, is to provide a new and improved snowmobile track adjuster and method which has all the advantages of the prior art and none of the disadvantages.

To attain this, the present invention essentially comprises a snowmobile having a front portion and a back portion. The back portion has a plurality of adjustable tracks thereon. The adjustable tracks serve to drive the snowmobile along a snow surface. The device contains a rectangular top plate having an upper surface and a lower surface. The upper surface and the lower surface are covered by a rubber material. The rectangular top plate has apertures formed through two end portions thereof. The rectangular top plate is removably placed on a top portion of the adjustable tracks of the snowmobile. The device contains a rectangular bottom plate having an upper surface and a lower surface. The upper surface and the lower surface are covered by a rubber material. The rectangular bottom plate has apertures formed through two end portions thereof. The lower surface has a securement nut secured to a central portion thereof. The device contains two bolts. Each of the two bolts is received through the apertures formed through the rectangular bottom plate and extending upwardly through the apertures formed through the rectangular top plate and coupled therewith by two wing nuts. The device contains a spring gauge having a hooked upper end. The hooked upper end couples with the securement nut of the rectangular plate for accurately adjusting the track on the snowmobile.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved snowmobile track adjuster which has all the advantages of the prior art tension devices for tracks and none of the disadvantages.

It is another object of the present invention to provide a new and improved snowmobile track adjuster which may be easily and efficiently manufactured and marketed.

It is a further object of the present invention to provide a new and improved snowmobile track adjuster which is of durable and reliable construction.

An even further object of the present invention is to provide a new and improved snowmobile track adjuster which is susceptible of a low cost of manufacture with regard to both materials and labor, and which accordingly is then susceptible of low prices of sale to the consuming public, thereby making such a snowmobile track adjuster economically available to the buying public.

Still yet another object of the present invention is to provide a new and improved snowmobile track adjuster which provides in the apparatuses and methods of the prior art some of the advantages thereof, while simultaneously overcoming some of the disadvantages normally associated therewith.

Even still another object of the present invention is to provide a new and improved snowmobile track adjuster for adjusting the tension in a track on a snowmobile.

Lastly, it is an object of the present invention to provide a new and improved snowmobile track adjuster with a rectangular top plate having an upper surface and a lower surface. The rectangular top plate has apertures formed through two end portions thereof. The rectangular top plate is removably placed on a top portion of the adjustable tracks of the snowmobile. A rectangular bottom plate has an upper surface and a lower surface. The rectangular bottom plate has apertures formed through two end portions thereof. The lower surface has a securement nut secured to a central portion thereof. The securement nut serves to hold a spring gauge for adjusting the tension of the tracks. Two bolts are received through the apertures formed through the rectangular bottom plate and extending upwardly through the apertures formed through the rectangular top plate and coupled therewith by two wing nuts.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
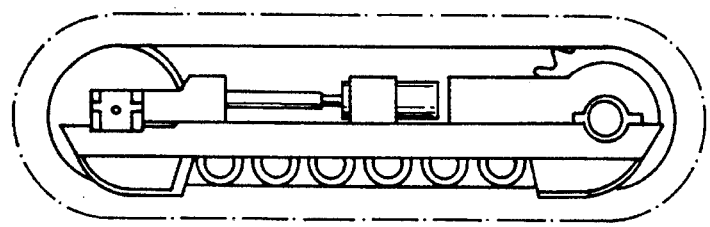
FIG. 1 is a diagrammatic side elevation view of the prior art apparatus for tensioning a track chain of a tracklaying vehicle.
Figure 2:
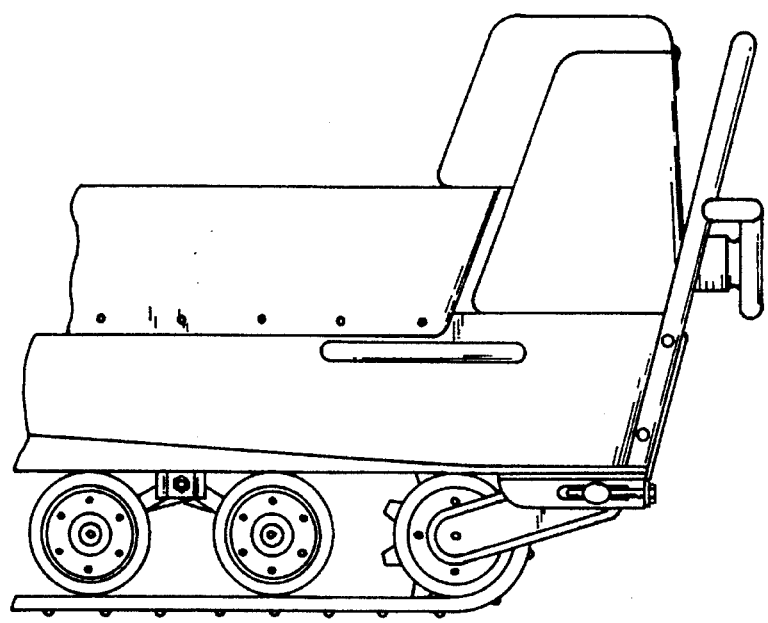
FIG. 2 is a side view of the prior art device for tensioning an endless track belt.
Figure 3:
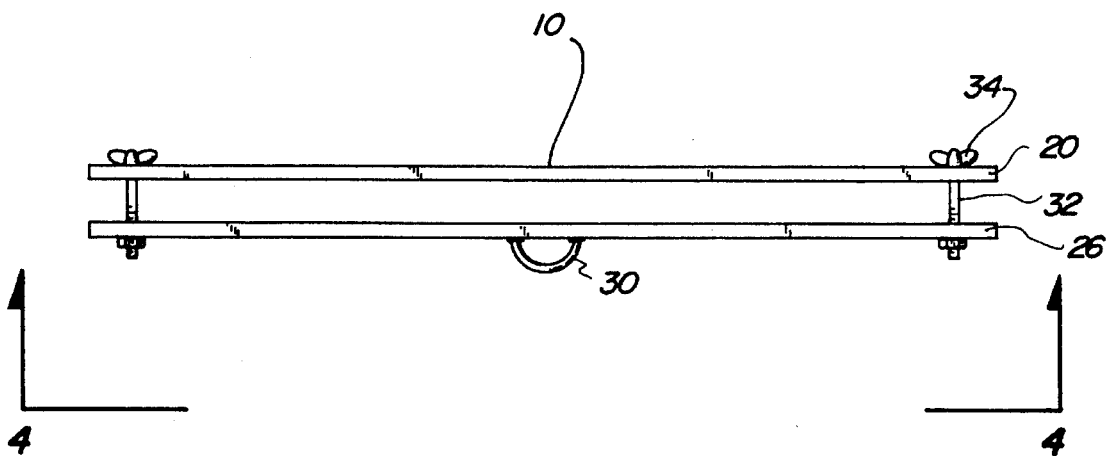
FIG. 3 is a side elevation view of the present invention.
Figure 4:
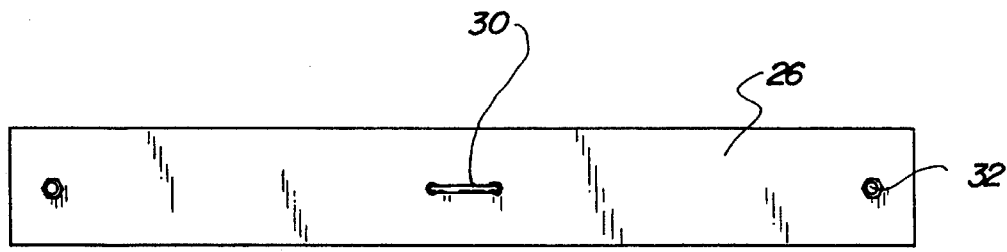
FIG. 4 is a cross-sectional view taken along line 4—4 of FIG. 3.
Figure 5:
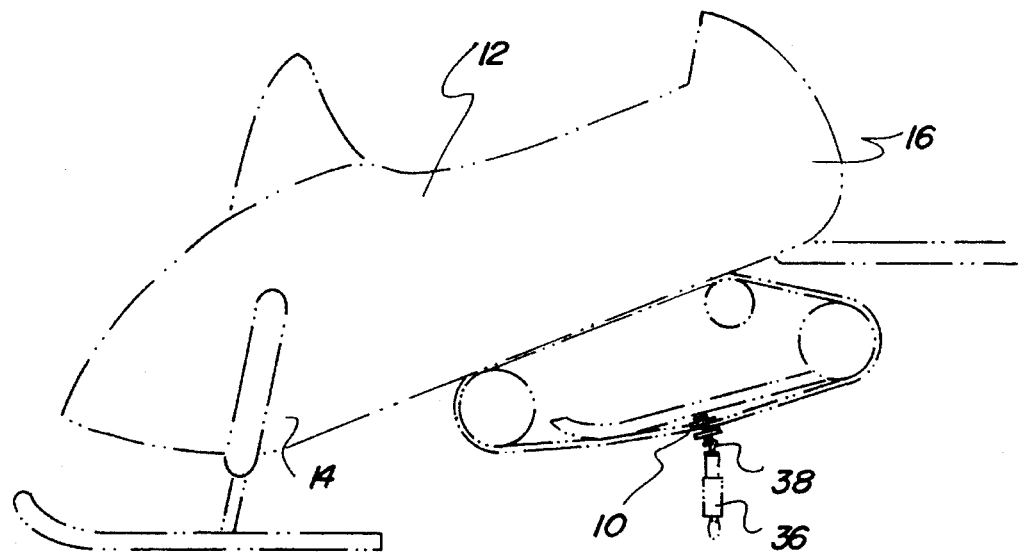
FIG. 5 is a perspective view of the present invention illustrated in place on the track of a snowmobile.
Figure 6:
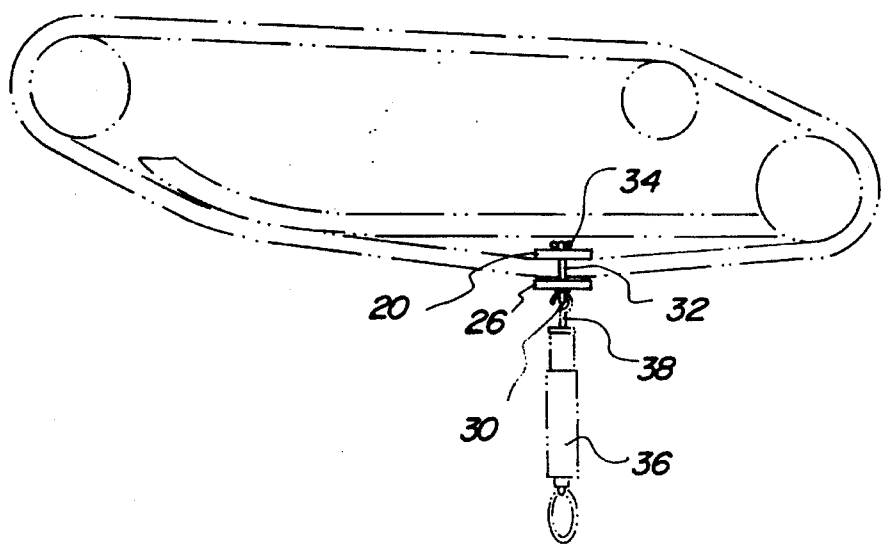
FIG. 6 is a front elevated view of the present invention illustrated in place on the track of a snowmobile.
Figure 7:
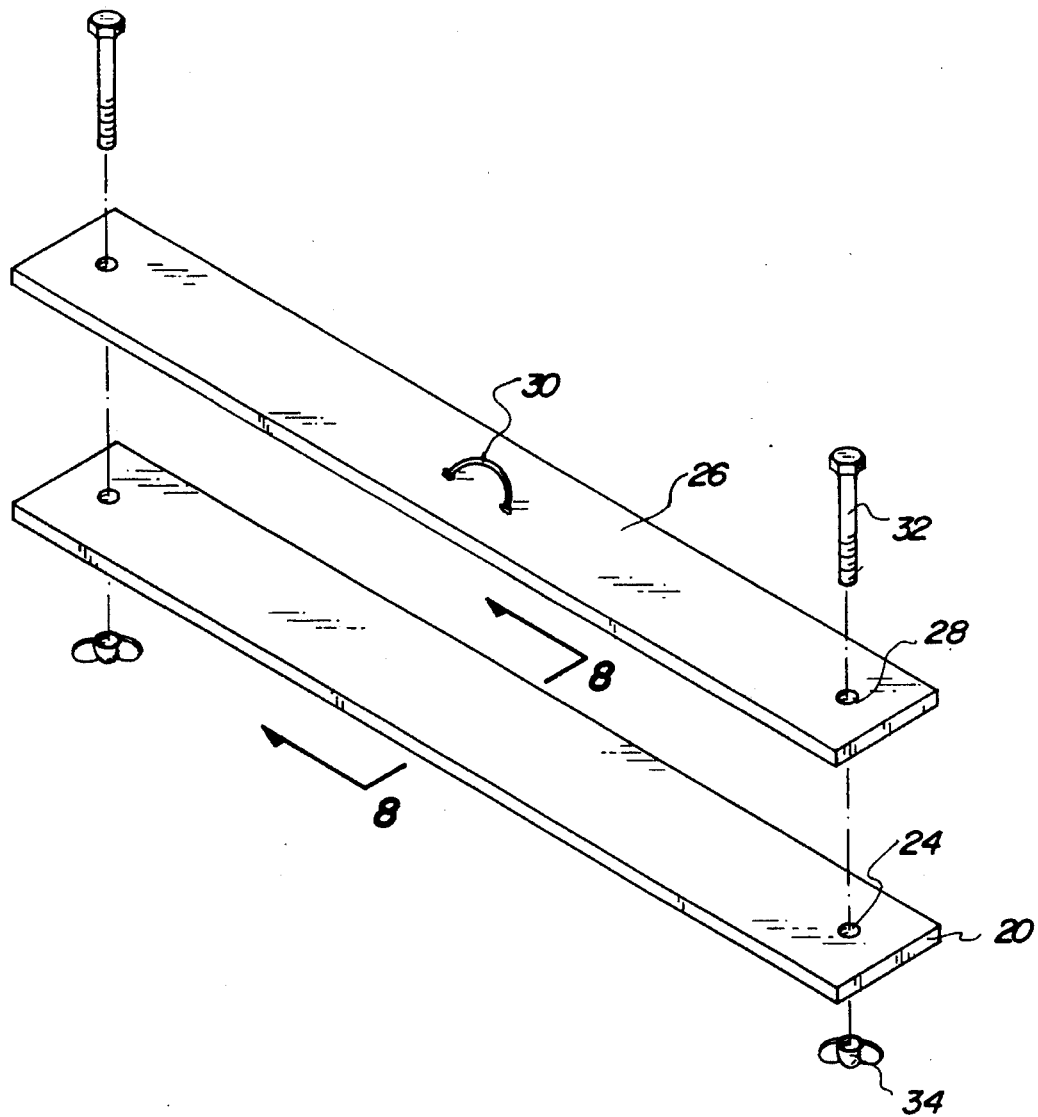
FIG. 7 is an exploded perspective view of the present invention.
Figure 8:
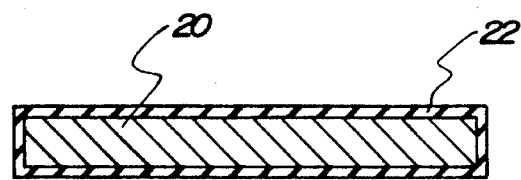
FIG. 8 is a cross-sectional view taken along line 8—8 of FIG. 7.

With reference now to the drawings, and in particular, to FIG. 3 thereof, the preferred embodiment of the new and improved snowmobile track adjuster embodying the principles and concepts of the present invention and generally designated by the reference number 10 will be described.

Specifically, it will be noted in the various Figures that the device relates to a new and improved snowmobile track adjuster for adjusting the tension in a track on a snowmobile. In its broadest context, the device consists of a snowmobile, a rectangular top plate, a rectangular bottom plate, two bolts, two wing nuts, and a spring gauge.

The device 10 is necessitated by a snowmobile 12 having a front portion 14 and a back portion 16. The back portion 16 has a plurality of adjustable tracks 18 thereon. The adjustable tracks 18 serve to drive the snowmobile 12 along a snow surface. The adjustable tracks 18 need to be constantly adjusted in order for proper operation of the snowmobile. If the tracks 18 are not properly adjusted, the user risks damaging the cycle bearings, suspension, the stretch tank, and the sprocket bearings. All of the aforementioned would cost significant amounts of funds to correct.

The device 10 contains a rectangular top plate 20 having an upper surface and a lower surface. The upper surface and the lower surface are covered by a rubber material 22. The rectangular top plate 20 has apertures 24 formed through two end portions thereof. The rectangular top plate 20 is removably placed on a top portion of the adjustable tracks 18 of the snowmobile 12.

The device 10 contains a rectangular bottom plate 26 having an upper surface and a lower surface. The upper surface and the lower surface are covered by a rubber material 22. The rectangular bottom plate 26 has apertures 28 formed through two end portions thereof. The lower surface has a securement loop 30 secured to a central portion thereof.

The device 10 contains two bolts 32. Each of the two bolts 32 is received through the apertures 28 formed through the rectangular bottom plate 26 and extending upwardly through the apertures 24 formed through the rectangular top plate 20 and coupled therewith by two wing nuts 34. The two bolts 32 and two wing nuts 34 provide an easy method of securing the device 10 to the tracks 18. The coupled top plate 20 and bottom plate 26 give the user a center pull on the tracks 18 that is evenly distributed, to give a more accurate read on the tension of the track 18.

The device 10 is necessitated by a spring gauge 36 having a hooked upper end 38. The hooked upper end 38 couples with the securement loop 30 of the rectangular bottom plate 26 for accurately adjusting the track 18 on the snowmobile 12. By pulling on the spring gauge 36, an accurate read on the tension of the tracks 18 is received. The track 18 can then be adjusted accordingly to prevent any damage to the snowmobile 12 and the track 18.

The present invention is a device to aid in adjusting the tension in the track on a snowmobile.

It is composed of seven main components: two wing nuts, two bolts, two flat rectangular iron plates, and a half inch nut. The nut is welded to the face of one of the plates. Each bolt traverses an end of each of the plates and is secured with a wing nut.

In order to adjust a track on a snowmobile, the center of the track must be pulled with a spring gauge to measure track deflection between the track and rails. To use this device, the snowmobile must be first be placed in a service position. The device slips around the track to provide a point for attaching a spring gauge. Remove one bolt and wing nut from the device and slip one bar between the track and the supporting surface, and the other bar over the track. Replace the bolt and wing nut and secure both bolts. Next, attach a spring .gauge to the nut on the top of the outer bar. The tension can be adjusted between the track and rails to manufacturer's specifications to ensure optimal performance for the machine.

This device is easy to use, which saves time and frustration. It is coated with a corrosion resistant finish, and provides excellent support to the system during adjustment. An important advantage of this device is the accuracy it provides for measuring deflection of the track.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A snowmobile track adjustment device for aiding in the adjustment of the tension in a track on a snowmobile comprising, in combination:

- a snowmobile having a front portion and a back portion, the back portion having a plurality of adjustable tracks thereon, the adjustable tracks serving to drive the snowmobile along a snow surface;

- a planar rectangular top plate having an upper surface and a lower surface, the upper surface and the lower surface covered by a rubber material, the rectangular top plate having apertures formed through two end portions thereof, the rectangular top plate removably placed on a top portion of the adjustable tracks of the snowmobile;

- a planar rectangular bottom plate having an upper surface and a lower surface, the upper surface and the lower surface covered by a rubber material, the rectangular bottom plate having apertures formed through two end portions thereof, the lower surface having a securement loop secured to a central portion thereof;

- two bolts, each of the two bolts received through the apertures formed through the rectangular bottom plate and extending upwardly through the apertures formed through the rectangular top plate and coupled therewith by two wing nuts; and

- a spring gauge having a hooked upper end, the hooked upper end coupled with the securement loop of the rectangular bottom plate for accurately adjusting the track on the snowmobile.

* * * * *